Patented June 23, 1931

1,811,115

UNITED STATES PATENT OFFICE

CARLETON ELLIS, OF MONTCLAIR, NEW JERSEY

RESINOUS COMPOSITION AND PROCESS OF MAKING SAME

No Drawing.    Application filed April 7, 1927. Serial No. 181,892.

This invention relates to a resinous composition and to the process of making same, and relates particularly to resinous bodies derived through reaction on polyhydric alcohols with organic acids and treatment with sulphur chloride, or other analogous reactive body.

In various copending applications I have described products derived by the action of a crystalline organic acid or anhydride and an oily fatty acid of high molecular weight on glycerol, glycol, pentaerythritol, and the like. According to the present invention products having different physical and chemical characteristics are obtained by reacting with sulphur chloride, and the like, on glycerol derivatives of this character, especially to produce soluble substances of a resinous character adapted for use in coating compositions and for other purposes.

The features of the invention can be set forth to best advantage by an illustrative example:

80 parts phthalic anhydride,
50 parts glycerol,
45 parts distilled cottonseed fatty acids, are heated gradually with stirring to a temperature of about 230° C., the acid number of the product being about 25. This intermediate material is dissolved in a mixture of 4 parts toluol to 1 part monochlorbenzol and is treated with 1 or 2 per cent of sulphur monochloride. There is a slight increase in viscosity of the solution and some heat is developed. In making large quantities and using higher proportions of sulphur chloride, cooling sometimes may be necessary.

The solution then may be neutralized by agitating with precipitated chalk, magnesium oxide, or any other suitable reagent to eliminate free mineral acid. On evaporation of the solvent a soluble resinous substance is obtained which does not have the slight tackiness of the intermediate product and which as a rule has a slightly higher melting point.

The elimination of the solvent mentioned is rather difficult simply by heating and vacuum or other methods may be employed to avoid over-heating the resin and causing undue discoloration.

The proportions given above, as well as those which follow, are by weight.

For some purposes a better solvent for the intermediate is a mixture of say, equal parts of benzol and ethyl acetate, such a solvent is more readily eliminated from the resin, if it is desired to obtain the latter in solid form.

Thus, 1000 parts of the cottonseed phthalic glycerol intermediate product described above, was dissolved in 1500 parts of a mixture consisting of equal parts of ethyl acetate and benzol. To this solution there was added 10 parts of sulphur monochloride and the mixture was stirred thoroughly and allowed to stand for about two hours, when finely-powdered magnesium oxide, 5 parts, was added and stirring continued until neutralization had progressed to the desired degree. The solution then was filtered and was found to be practically neutral to phenol phthalein.

Such a solution can be incorporated to advantage with a cellulose ester such as nitrocellulose, alone with any desired quantity of plasticizers, pigments, and the like, to form lacquers and lacquer enamels.

A solution of the resin, without other additions, may be used as a coating composition, in some cases. Likewise, pigment may be mixed with the solution of the resin alone to form a coating composition.

In a similar manner the fatty acids of other oils such as corn, soya bean, linseed, tung, fish oils, and the like, may be caused to react with glycerol or other polyhydric alcohol and organic acids such as succinic, citric, tartaric, maleic, salicylic, benzoic, and the like, or mixtures of these. In some cases the anhydride may be used to advantage, as for example, when making the phthalic derivative. Likewise, other unsaturated acids may be employed in some cases in place of the oily fatty acids. Furthermore, the fatty oils, that is, the glycerides themselves, may be used in certain cases, as for example, castor oil may be caused to react with phthalic anhydride and glycerol and the product treated with sulphur chloride, or other reagent having an analogous effect.

It is important to avoid more than a comparatively small proportion of the sulphur chloride, as higher proportions form discolored insoluble substances which are of little or no value in coating compositions. Therefore, I prefer to limit the proportion of sulphur chloride to 1 or 2 parts to 100 parts of the intermediate product. Preferably the reaction with the sulphur chloride is caused to take place in the cold, or at room temperature in order to avoid any tendency towards the formation of insoluble or discolored products.

When prepared as described in the above illustrative example a solid resinous body may be obtained which is light in color, fusible, not sticky or tacky, and at room temperature, or in the cold, has a slight tendency towards brittleness; although contrasted with many resins, has a considerable degree of toughness.

When the proportion of sulphur chloride is increased to say, 5 to 10 per cent of the weight of the intermediate product, insoluble, discolored substances result, and most of these are not fusible. For this reason, as noted, the proportion of the sulphur chloride, although capable of making a very considerable change in the quality of the product, when used in small proportion, should be in the neighborhood of 1 or 2 per cent.

The extreme range for most practical purposes in making coating compositions is from ½ of 1 per cent up to 4 per cent.

After treatment with the sulphur chloride the sulpho-chlorinated product is adapted for a considerable number of uses to which the intermediate product, because of its tackiness, would not be suitable.

For example, the product of the present invention may be dissolved in a solvent such as those specified and used to impregnate paper to render it water-resistant, and in some cases, transparent or translucent. By passing ordinary glassine paper through a 30 or 40 per cent solution of the sulpho-chlorinated product, a relatively high degree of transparency is imparted to the paper and the surface becomes very glossy, so that the product somewhat resembles cellophane. The incorporation in the solution of some nitrocellulose, and particularly low viscosity, e. g., one-half second nitrocellulose, is of advantage in some cases, the resulting transparentized paper being tougher and more flexible. A proportion of 1 part of low viscosity nitrocellulose to 8 parts of the sulpho-chlorinated product is useful, and this proportion of nitrocellulose does not unduly increase the flammability of the paper. On the other hand different proportions of nitrocellulose such as 1 part of the latter to 4 parts of the sulpho-chlorinated product may be used, variations in the proportions being made, as desired, since nitrocellulose and the sulpho-chlorinated product apparently are miscible through a wide range of proportions.

In lieu of sulphur monochloride I may use sulphur dichloride or other halogenated compounds such as sulphur bromide or mixtures of these, and also may employ alone, or especially in conjunction with sulphur chloride, other reagents such as the corresponding derivatives of selenium and also phosphorous chlorides and the oxy chloride. These, in general, are more expensive, and I prefer to employ commercial sulphur chloride which is relatively cheap and which if employed only in small proportion brings about polymerization and other deep-seated changes.

The effect of gently baking the sulpho-chlorinated product is to gradually convert it into a less soluble or an insoluble heat-resistant mass.

Thus, for example, the cottonseed fatty acid phthalic glycerol intermediate described above and the sulpho-chlorinated derivative were heated alongside for a considerable period of time at a tempearture of about 65° C. The first mentioned or intermediate material increased during that time in melting point (ball and ring method) from 62° C. to about 64° C. A large proportion of the product was soluble in chlorobenzol, or in a mixture of ethyl alcohol and benzol. Under the same conditions the sulpho-chlorinated product (1 per cent sulphur chloride) became practically insoluble and also substantially infusible. Thus, the sulpho-chlorinated product possesses properties which differ from those of the intermediate product. It is a matter of interest that so small a proportion of sulphur chloride should make so great a difference in the changes taking place when heat is applied.

In specifying the proportions of cottonseed fatty acids, phthalic anhydride and glycerol employed in the foregoing illustration, it should be understood that I do not wish to be limited thereto since these proportions may be altered considerably to prepare sulpho-chlorinated products of different properties. For example, the proportion of the cottonseed fatty acids may be increased and it will be found that the intermediate product becomes softer, finally with relatively high proportions of the cottonseed fatty acids appearing as a liquid product. With higher proportions of the cottonseed fatty acids a more soluble intermediate product is obtained and the employment of a somewhat larger proportion of sulphur chloride is not precluded under these conditions. The higher the content of combined cottonseed fatty acids, the larger the proportion of sulphur chloride, as a general rule, and within certain limits, may be introduced to yield a soluble and fusible sulpho-chlorinated derivative.

What I claim is:

1. A soluble and fusible sulpho-chlorinated glyceride resin.

2. A soluble and fusible sulpho-chlorinated, cottonseed fatty acid, phthalic glyceride resin.

3. The process which comprises heating cottonseed fatty acids, phthalic acid and glycerol together to form an intermediate and reacting on said intermediate with sulphur chloride in an amount not exceeding 4% of the weight of the intermediate.

4. The process which comprises heating cottonseed fatty acids, phthalic acid and glycerol together to form an intermediate and reacting on a solution of the intermediate with sulphur chloride in an amount not exceeding 4% of the weight of the intermediate.

5. A sulpho-chlorinated glyceride resin.

6. A poly-hydric alcohol resin treated with a reactive halide therewith.

7. A heat hardened sulpho-chlorinated glyceride resin.

8. The process which comprises forming a poly-hydric alcohol and organic acid resin and reacting on said resin with a halide reactive therewith.

9. The process which comprises treating a glyceride resin with a halide reactive therewith while cooling the reaction mass.

10. The process which comprises treating a glyceride resin with sulphur chloride in an amount of from 1 to 2% insufficient to form substantially discolored products.

11. The process which comprises reacting on a glyceride resin with a halide reactive therewith under temperature conditions insufficient to form substantially discolored products.

12. The process which comprises forming a sulpho-chlorinated glyceride resin and heating the resin to render it less soluble.

13. A process as set forth in claim 3 wherein the reaction product after treatment with sulphur chloride is neutralized.

14. A sulphochlorinated, polyhydric alcohol, polybasic organic carboxylic acid, monobasic organic carboxylic acid resin.

15. A sulphochlorinated, polyhydric alcohol, polybasic organic carboxylic acid, fatty oil acids resin.

16. A polyhydric alcohol, polybasic organic carboxylic acid, monobasic organic carboxylic acid resin treated with a halide reactive therewith.

17. A polyhydric alcohol, polybasic organic carboxylic acid, fatty oil acids resin treated with a halide reactive therewith.

18. A heat-hardened sulphochlorinated, polyhydric alcohol, polybasic organic carboxylic acid, monobasic organic carboxylic acid resin.

19. A heat-hardened sulphochlorinated, polyhydric alcohol, polybasic organic carboxylic acid, fatty oil acids resin.

20. A sulphochlorinated glycol, polybasic organic carboxylic acid, monobasic organic carboxylic acid resin.

21. A heat-hardened sulphochlorinated glycol, polybasic organic carboxylic acid, monobasic organic carboxylic acid resin.

CARLETON ELLIS.